United States Patent
Liu

(10) Patent No.: US 8,994,679 B2
(45) Date of Patent: Mar. 31, 2015

(54) TOUCH PANEL, TOUCH DISPLAY APPARATUS USING THE SAME AND MANUFACTURED METHOD THEREOF

(75) Inventor: Chien-Hsin Liu, Miao-Li County (TW)

(73) Assignees: Innocom Technology(Shenzhen)Co., Ltd., Shenzhen (CN); Innolux Corporation, Miao-Li County (TW)

( * ) Notice: Subject to any disclaimer, the term of this patent is extended or adjusted under 35 U.S.C. 154(b) by 27 days.

(21) Appl. No.: 13/566,436

(22) Filed: Aug. 3, 2012

(65) Prior Publication Data

US 2013/0033446 A1 Feb. 7, 2013

(30) Foreign Application Priority Data

Aug. 4, 2011 (TW) .............................. 100127808 A

(51) Int. Cl.
*G06F 3/041* (2006.01)
*G06F 3/044* (2006.01)

(52) U.S. Cl.
CPC ...... *G06F 3/044* (2013.01); *G06F 2203/04103* (2013.01); *G06F 2203/04111* (2013.01)
USPC ....................................................... 345/173

(58) Field of Classification Search
None
See application file for complete search history.

(56) References Cited

U.S. PATENT DOCUMENTS

| 5,810,923 A * | 9/1998 | Yano et al. ........................ 117/84 |
| 2001/0035551 A1 * | 11/2001 | Kotecki et al. ................. 257/306 |
| 2009/0167975 A1 * | 7/2009 | Lee et al. ......................... 349/43 |
| 2010/0026661 A1 * | 2/2010 | Teramoto ...................... 345/174 |
| 2010/0053115 A1 * | 3/2010 | Kim et al. ..................... 345/174 |
| 2010/0261119 A1 * | 10/2010 | Li et al. .......................... 430/319 |
| 2010/0267177 A1 * | 10/2010 | Chen et al. ...................... 438/34 |
| 2011/0006998 A1 * | 1/2011 | Kang et al. .................... 345/173 |
| 2011/0043383 A1 | 2/2011 | Kang et al. |
| 2011/0073855 A1 * | 3/2011 | Lin ................................. 257/43 |
| 2011/0169002 A1 * | 7/2011 | Jan et al. ......................... 257/59 |
| 2011/0193801 A1 * | 8/2011 | Jung et al. ..................... 345/173 |
| 2011/0207055 A1 * | 8/2011 | Jun et al. ....................... 430/313 |
| 2012/0113042 A1 * | 5/2012 | Bayramoglu et al. ........ 345/174 |
| 2012/0139871 A1 * | 6/2012 | Ku et al. ....................... 345/174 |

FOREIGN PATENT DOCUMENTS

| CN | 101893975 A | 11/2010 |
| KR | 101049006 B1 | 7/2011 |

OTHER PUBLICATIONS

English Abstract translation of KR101049006 (Published Jul. 12, 2011).
English Abstract translation of CN101893975 (Published Nov. 24, 2010).

* cited by examiner

*Primary Examiner* — Antonio Xavier
(74) *Attorney, Agent, or Firm* — McClure, Qualey & Rodack, LLP

(57) ABSTRACT

A manufacturing method of a touch panel is provided. The method includes the following steps. A conductive layer is formed on a substrate, and a dielectric layer is formed to cover the conductive layer. The conductive layer and the dielectric layer are then patterned to respectively form several sensing wires and several dielectric blocks by using a first mask, which is a half-tone mask. Next, a transparent conductive layer is first formed to cover the conductive layer and the dielectric layer, and is then patterned to form a touch sensing structure by using a second mask.

4 Claims, 10 Drawing Sheets

TOUCH PANEL, TOUCH DISPLAY APPARATUS USING THE SAME AND MANUFACTURED METHOD THEREOF This application claims the benefit of Taiwan application Serial No. 100127808, filed Aug. 4, 2011, the subject matter of which is incorporated herein by reference.

BACKGROUND

1. Field of the Invention

The disclosure relates in general to a touch panel, a touch display apparatus using the same and a manufacturing method thereof, and more particularly to a touch panel fabricated by a half-tone mask process, a touch display apparatus using the same and a manufacturing method thereof.

2. Description of the Related Art

A conventional touch panel includes a substrate and a sensing layer, with the sensing layer being formed on the substrate. The sensing layer is generally formed by several mask processes. For example, using a first mask process, a number of first sensing units along a particular direction are formed on the substrate. Using a second mask process, a number of metal sensing wires are formed along the direction and are electrically connected with the first sensing units. Using a third mask process, an insulating layer is formed to cover the metal sensing wires. Using a fourth mask process, a number of second sensing units are formed along another direction on the insulating layer and the substrate. Using a fifth mask process, a protection layer is then formed to cover the first sensing units and the second sensing units.

SUMMARY

The disclosure relates to a touch panel, a touch display apparatus using the touch panel, and a manufacturing method of the touch panel. In an embodiment, only two mask processes are required for completing a sensing layer of the touch panel, so that production time and cost are reduced.

According to an aspect of the present disclosure, a manufacturing method of a touch panel is provided. The manufacturing method includes steps of: forming a conductive layer on a substrate; forming a dielectric layer to cover the conductive layer; using a first mask to pattern the conductive layer and the dielectric layer to respectively form a plurality of sensing wires and a plurality of dielectric blocks, wherein the first mask is a half-tone mask;

forming a transparent conductive layer to cover the dielectric layer and the conductive layer; and using a second mask to pattern the transparent conductive layer to form a touch sensing structure.

According to another aspect of the present disclosure, a touch panel is provided. The touch panel includes a substrate, a plurality of sensing wires, a plurality dielectric blocks and a touch sensing structure. The sensing wires are formed on the substrate. The dielectric blocks are formed on the sensing wires and include a plurality of through holes, with the sensing wires exposed from the through holes. The touch sensing structure covers the dielectric blocks and is extended to the sensing wires via the through holes. An outer lateral surface or an inner lateral surface of each of the sensing wires is connected to an outer lateral surface of the corresponding dielectric blocks. The sensing wires and the dielectric blocks are fabricated through the same half-tone mask.

According to yet another aspect of the present disclosure, a touch display apparatus is provided. The touch display apparatus includes a display unit and the abovementioned touch panel. The display unit provides a display image. The touch panel is disposed adjacent to the display unit for providing a touch sensing function.

The above and other aspects of the disclosure will become better understood with regard to the following detailed description of the preferred but non-limiting embodiments. The following description is made with reference to the accompanying drawings.

DETAILED DESCRIPTION

FIGS. 1A to 1H show diagrams of a manufacturing process for a touch panel according to an embodiment of the present disclosure.

Figure 1A:
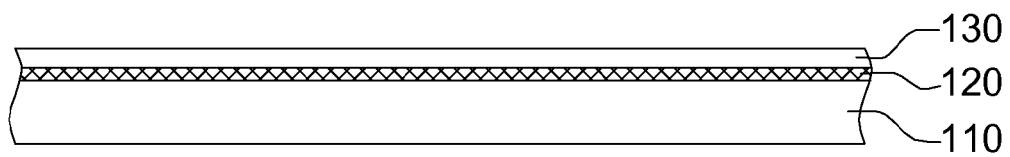
FIGS. 1A to 1H are diagrams of a manufacturing process of a touch panel according to an embodiment of the present disclosure.

Referring to FIG. 1A, a conductive layer 120 is formed on a substrate 110. For example, the conductive layer 120 is an intact conductive layer, i.e., the conductive layer 120 is a conductive layer without any hollowed out patterns. For example, the conductive layer 120 is formed by chemical vapor deposition, electroless plating, electrolytic plating, printing, spin coating, spray coating, sputtering or vacuum deposition. The conductive layer 120 may be formed from a metal. For example, the conductive layer 120 is selected from the group consisting of gold, silver, and copper.

As shown in FIG. 1A, a dielectric layer 130 is formed to cover the conductive layer 120. For example, the dielectric layer 130 is an intact dielectric layer, i.e., the dielectric layer 130 is a non-patterned dielectric layer.

Figure 1B:
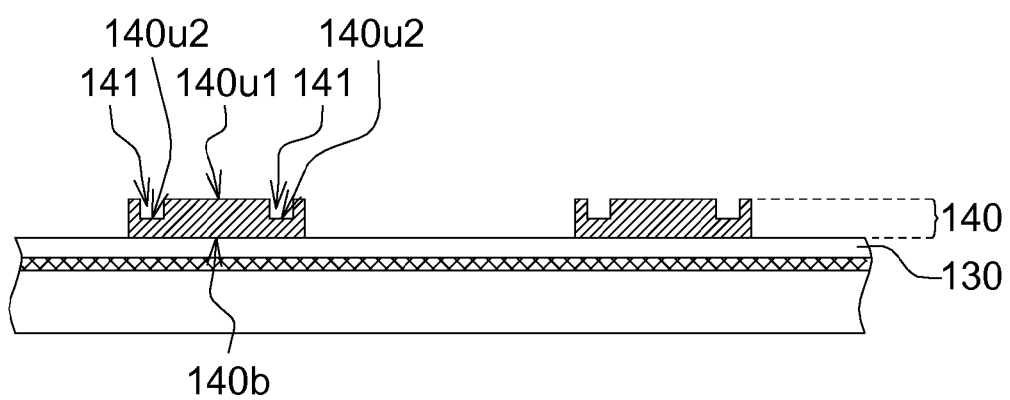
Figure 1C:
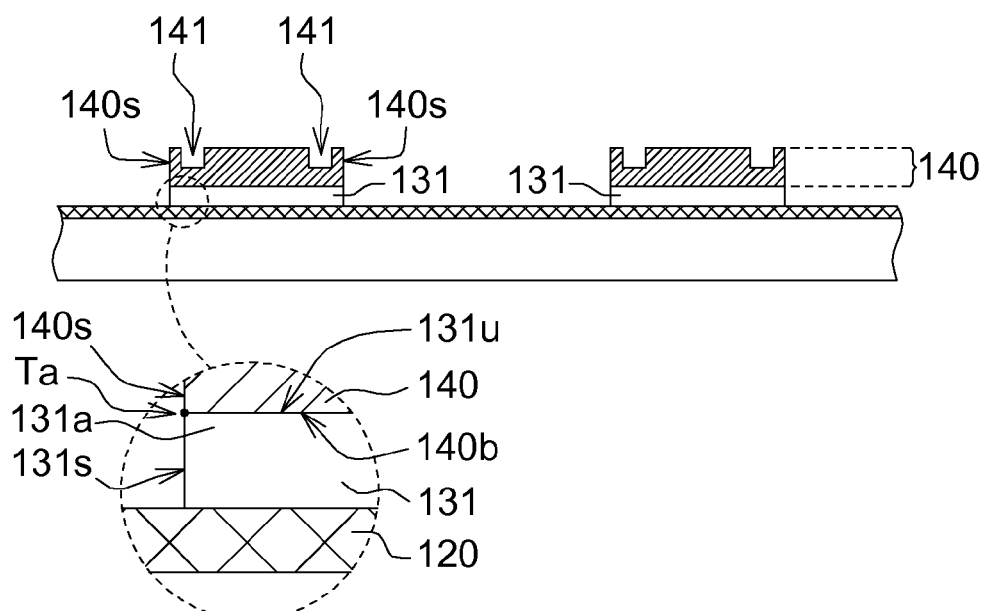
Figure 1D:
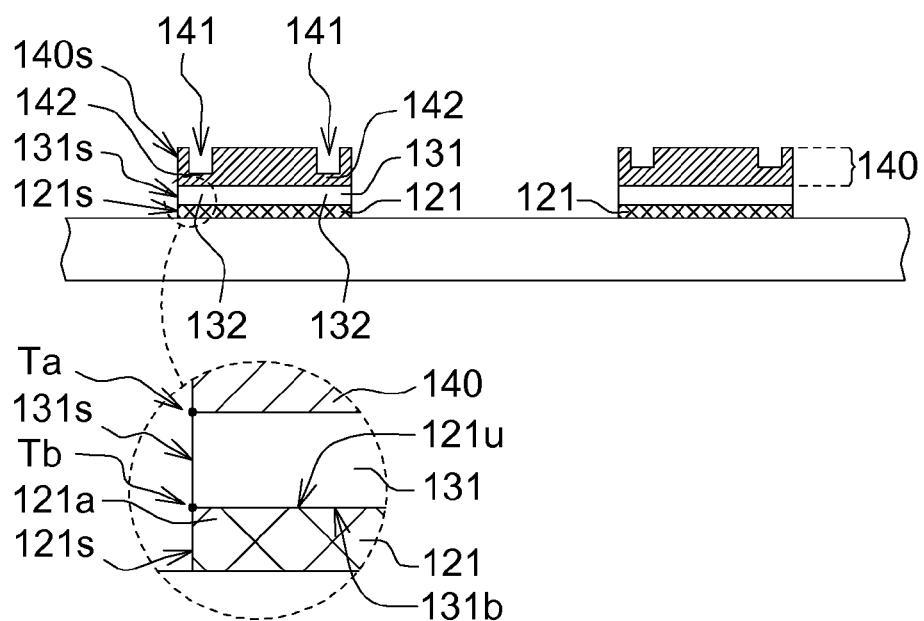
Figure 1E:
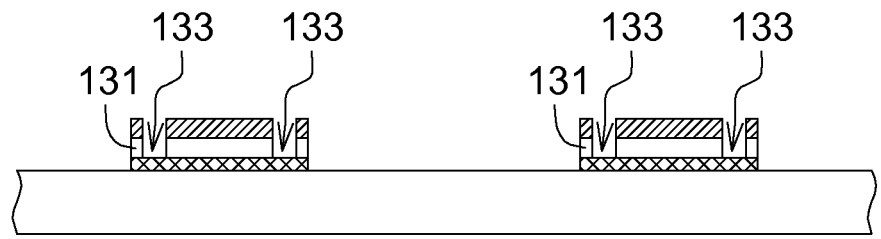

After forming the dielectric layer 130, through a first mask, the conductive layer 120 and the dielectric layer 130 are patterned to respectively form a plurality of sensing wires 121 (as shown in FIG. 1D) and a plurality of dielectric blocks 131 (as shown in FIG. 1E). The first mask is a half-tone mask, with details thereof to be described below.

Referring to FIG. 1B, through a half-tone mask (not shown), a patterned photoresist layer 140 is formed on the dielectric layer 130. The patterned photoresist layer 140 includes a plurality of recessions 141. Further, through the half-tone mask, the recessions 141 are formed at the patterned photoresist layer 140. Each of the recessions 141 is extended by a distance from an upper surface 140$u$1 of the patterned photoresist layer 140 downwards to a lower surface 140$b$ of the patterned photoresist layer 140.

The distance is smaller than a thickness of the patterned photoresist layer 140, in a way that the recessions 141 do not penetrate through the patterned photoresist layer 140. From a cross-section, due to the design of the recessions 141, the patterned photoresist layer 140 is formed as two upper surfaces having different heights. Moreover, the patterned photoresist layer 140 is formed as the upper surfaces 140u1 and bottom surfaces 140u2 corresponding to the recessions 141 of the patterned photoresist layer 140.

The half-tone mask includes several transparent regions. After passing through the half-tone mask, light beams may have different intensities corresponding to different transparent regions of the half-tone mask, such that a part of the patterned photoresist layer 140 is radiated by light beams with one intensity, and another part of the patterned photoresist layer 140 is radiated by light beams with another intensity. Through the above feature of the half-tone mask, the recessions 141 are formed after a development process.

Referring to FIG. 1C, by using the patterned photoresist layer 140 as a mask, the dielectric layer 130 (as shown in FIG. 1B) is patterned to form a plurality of dielectric blocks 131. In the process of patterning the dielectric layer 130, the patterned photoresist layer 140 is used as a mask to keep the dielectric blocks 131 covered by the patterned photoresist layer 140. The dielectric layer 130 may be patterned by laser or etching such as dry etching. With dry etching, the patterned photoresist layer 140 serves as an etch stop layer. Compared to wet etching, outer lateral surfaces 131s formed by dry etching are coarser.

Since the patterned photoresist layer 140 is used as a mask, upper portions 131a of the dielectric blocks 131 are not easily removed. The upper portions 131a are a part of the dielectric blocks 131 for connecting with the patterned photoresist layer 140. Referring to FIG. 1C, each of the outer lateral surfaces 131s of the dielectric blocks 131 is connected with an outer lateral surface 140s of the patterned photoresist layer 140 at a connecting portion Ta. In the present embodiment, the outer lateral surfaces 131s of the dielectric blocks 131 are substantially aligned with the outer lateral surfaces 140s of the patterned photoresist layer 140. For example, the outer lateral surfaces 131s and the outer lateral surfaces 140s are coplanar.

An upper surface 131u of each of the dielectric block 131 is given a large area since the upper portions 131a of the dielectric blocks 131 are not easily removed. For example, the area of the upper surfaces 131u of the dielectric blocks 131 is substantially equal to an area of the lower surfaces 140b of the patterned photoresist layer 140.

As shown in FIG. 1D, by using the patterned photoresist layer 140 as a mask, the conductive layer 120 is patterned to form a plurality of sensing wires 121. In the process of patterning, the patterned photoresist layer 140 is used as a mask to keep the sensing wires 121 covered by the patterned photoresist layer 140. The conductive layer 120 may be patterned by wet etching. Under the conditions, the patterned photoresist layer 140 serves as an etch stop layer.

As described above, it is illustrated that the dielectric blocks 131 and the sensing wires 121 are formed through the patterned photoresist layer 140. Moreover, in the present embodiment, it is not required to use other mask processes, the dielectric blocks 131 and the sensing wires 121 can be formed through the same patterned photoresist layer 140. Accordingly, the dielectric blocks 131 are substantially aligned with the sensing wires 121 in a way that the dielectric blocks 131 and the sensing wires 121 are unlikely dislocated, thereby optimizing a yield rate of the touch panel. In the present embodiment, the mask process refers to a process that requires mask positioning or a lithography process (exposure/etching/developing).

Since the patterned photoresist layer 140 is used as a mask, upper portions 121a of the sensing wires 121 are not easily removed. The upper portions 121a are a part of the sensing wires 121 for connecting with the dielectric blocks 131. Referring to FIG. 1 D, each of the outer lateral surfaces 121s of the sensing wires 121 is connected with an outer lateral surface 131s of the dielectric blocks 131 at a connecting portion Tb. In the present embodiment, the outer lateral surfaces 121s of the sensing wires 121 are substantially aligned with the outer lateral surfaces 131s of the dielectric blocks 131. For example, the outer lateral surfaces 121s and the outer lateral surfaces 131s are coplanar.

Since the upper portions 121a of the sensing wires 121 are not easily removed, the area of an upper surface 121u of each of the sensing wire 121 is large. For example, the area of the upper surfaces 121u of the sensing wire 121 is substantially equal to an area of the lower surfaces 131b of the dielectric blocks 131. Thus, each of the dielectric blocks 131 may substantially completely overlap the corresponding sensing wire 121. In an embodiment, the area of the lower surfaces 131b of dielectric blocks 131 is greater than the area of the upper portions 121a of the sensing wires 121, such that at least one lateral surface of each of the dielectric blocks 131 protrudes beyond a corresponding lateral surface of the sensing wire 121.

In the present embodiment, the patterned photoresist layer 140 covers the entire upper surfaces 121u of the sensing wires 121 to keep the upper surfaces 121u of the sensing wires 121 unexposed from the patterned photoresist layer 140. In another embodiment, in the process of forming the patterned photoresist layer 140, the patterned photoresist layer 140 may be selectively penetrated such that the sensing wires 121 are exposed from the patterned photoresist layer 140. For example, in the patterning process, portions 142 corresponding to the recessions 141 of the patterned photoresist layer 140 may be removed to allow the recessions 141 to extend to the sensing wires 121, such that the sensing wires 121 are exposed from the recessions 141.

Referring to FIG. 1E, portions 132 (as shown in FIG. 1D) of the dielectric blocks 131 corresponding to the recessions 141a are removed to provide each of the dielectric blocks 131 with a plurality of through holes 133, for example two through holes 133. The sensing wires 121 may be exposed from the through holes 133. Compared to a design without the recessions 141, the recessions 141 in the present embodiment renders a smaller part of the patterned photoresist layer 140 (portions 142 shown in FIG. 1D) needed to be removed, thereby allowing the through holes 133 of the dielectric blocks 131 to form in a short period of time.

Figure 1F:
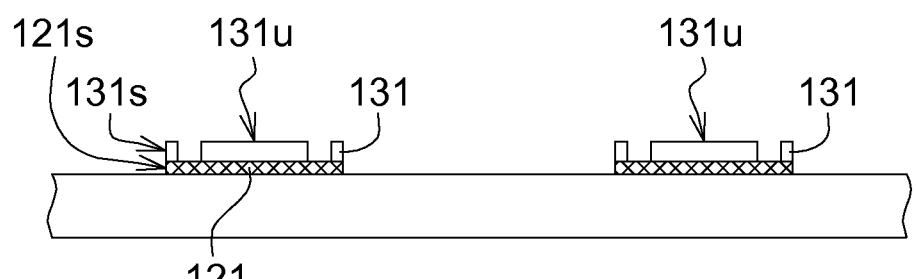

Referring to FIG. 1F, the patterned photoresist layer 140 (as shown in FIG. 1 E) is removed to expose the dielectric blocks 131 such as the upper surfaces 131u of the dielectric blocks 131. The patterned photoresist layer 140 is removed by etching for example.

In FIG. 1F, the outer lateral surfaces 121s of the sensing wires 121 are connected to the outer lateral surfaces 131s of the corresponding dielectric blocks 131, such exemplification not meant to be limited. In another embodiment (as shown in FIG. 5F), the outer lateral surfaces 121s of each of the sensing wires 121 may be connected to inner lateral surfaces 431ss of the corresponding dielectric block 431, with details to be described below.

Figure 1G:
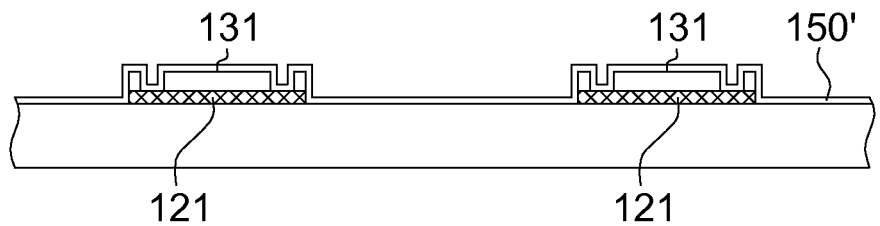

As shown in FIG. 1G, a transparent conductive layer 150' is formed to cover the dielectric blocks 131 and the sensing wires 121.

Figure 1H:
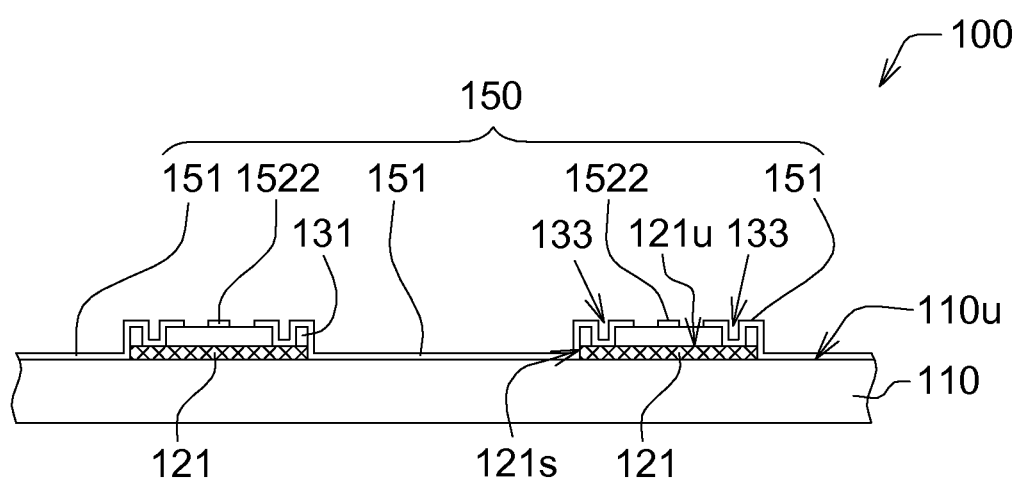

Referring to FIG. 1H, through a second mask, the transparent conductive layer 150' is patterned to form a touch sensing structure 150. The touch sensing structure 150 covers a part of the dielectric blocks 131 and is extended from the through holes 133 to the sensing wires 121 to form the touch panel 100. In the present embodiment, a capacitive touch panel is taken as an example for the touch panel 100 but is not to be construed as limiting the present disclosure.

The sensing wires 121, the dielectric blocks 131 and the touch sensing structure 150 are combined as a sensing layer of the present embodiment. A coordinate of touched point may be obtained by calculating a signal sensed through the sensing layer.

In the present embodiment, the touch sensing structure 150 covers a part of the upper surfaces 121u of the sensing wires 121 and outer lateral surfaces 121s of the sensing wires 121, and the dielectric blocks 131 cover a remaining part of the upper surfaces 121u of the sensing wires 121, such that the touch sensing structure 150, the dielectric blocks 131 and the substrate 110 encapsulate the entire sensing wires 121 to completely protect the sensing wires 121.

Since the dielectric blocks 131 are substantially aligned with the sensing wires 121 (the outer lateral surfaces 131s of the dielectric blocks 131 are connected with the outer lateral surfaces 121s of the sensing wires 121), connecting portions between the outer lateral surfaces 131s of the dielectric blocks 131 and the outer lateral surfaces 121s of the sensing wires 121 are prevented from severe dislocation or even completely prevented from dislocation. Accordingly, parts of the touch sensing structure 150 extended along the outer lateral surfaces 131s and the outer lateral surfaces 121s are not formed as sharp corners.

As described above, it is illustrated that the present embodiment of the present disclosure is capable of completing the touch panel 100 by using merely two mask processes (as shown in FIG. 1B and FIG. 1H).

Figure 2:
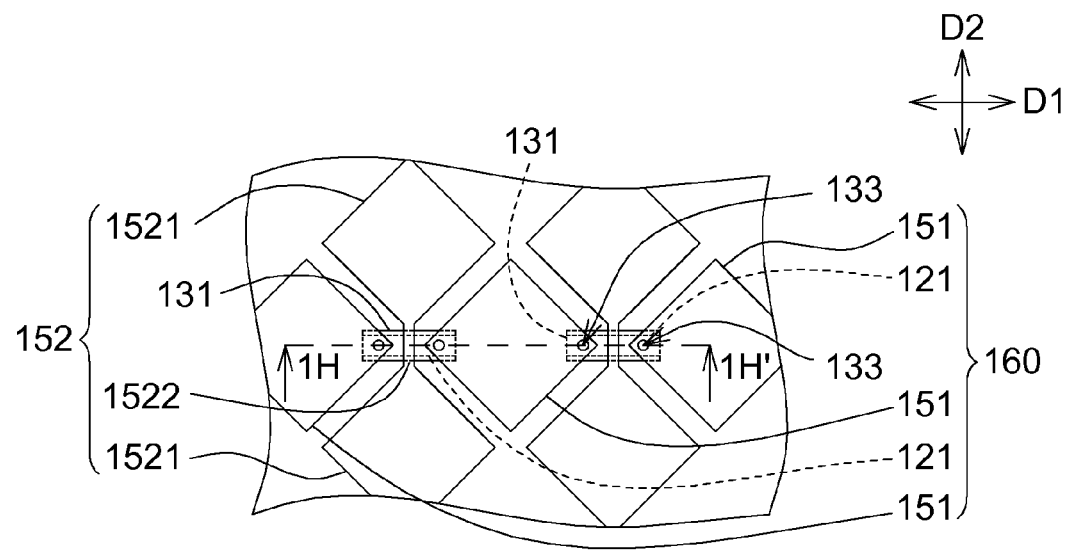
FIG. 2 is a top view of FIG. 1H.

Referring to both FIG. 1H and FIG. 2, FIG. 2 shows a top view of FIG. 1H, and FIG. 1H shows a cross-section of FIG. 2 along a direction 1H-1H'. The touch sensing structure 150 includes at least one first sensing electrode 160 and at least one second sensing electrode 152. The first sensing electrode 160 is arranged along a first direction D1, and the second sensing electrode 152 is arranged along a second direction D2.

To clearly represent the sensing wires 121, the sensing wires 121 are depicted by dotted lines in the dielectric blocks 131. In practice, the dielectric blocks 131 may completely overlap the sensing wires 121. Alternatively, the dielectric blocks 131 may be larger than the sensing wires 121, as shown in FIG. 2.

Referring to FIG. 2, each first sensing electrode 160 includes a plurality of first sensing units 151. The first sensing units 151 and the sensing wires 121 are formed on the upper surface 110u of the substrate 110 (the substrate 110 and the upper surface 110u are shown in FIG. 1H), and are arranged along the first direction D1. The adjacent two first sensing units 151 are electrically connected to the sensing wire 121 respectively via two through holes 133 of the corresponding dielectric block 131. The first sensing units 151 and the sensing wires 121 form the first sensing electrode 160. A coordinate of a touch point along the first direction D1 may be obtained through the corresponding first sensing electrode 160.

Each second sensing electrode 152 includes a plurality of second sensing unit 1521 and a plurality of sensing wires 1522. The second sensing units 1521 and the sensing wires 1522 are arranged along the second direction D2. The second direction D2 is substantially perpendicular to the first direction D1. In the present embodiment, for example, the first direction D1 is the X-axis and the second direction D2 is the Y-axis. The sensing wires 1522 cross the corresponding dielectric block 131 to connect to the adjacent two second sensing units 1521. The second sensing units 1521 and the sensing wires 1522 form the second sensing electrode 152. A coordinate of a touch point along the second direction D2 may be obtained through the corresponding second sensing electrode 152.

The first sensing units 151, the second sensing units 1521 and the sensing wires 1522 may be formed by a same material such as transparent tin-dope indium oxide (ITO).

Further, though the outer lateral surfaces 121s of the sensing wires 121 being substantially aligned with the outer lateral surfaces 131s of the dielectric blocks 131 (as shown in FIG. 1D) are taken as an example, such exemplification is not meant to be limited. An embodiment of the outer lateral surfaces of sensing wires being unaligned with the outer lateral surfaces of the dielectric blocks is described below in FIGS. 3 and 4.

Figure 3:
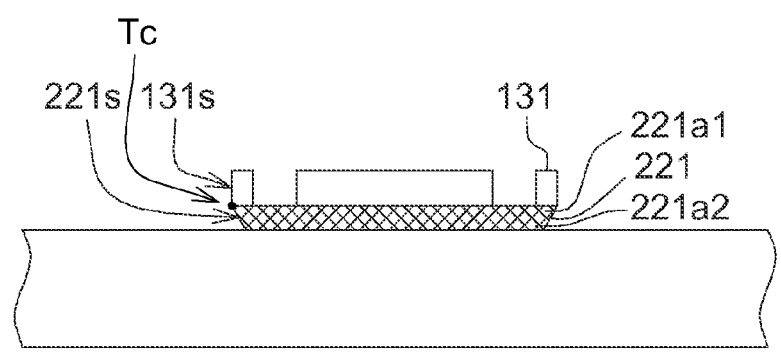
FIG. 3 is a cross-section of a sensing wire and a dielectric block of a touch panel according to another embodiment of the present disclosure.

FIG. 3 shows a cross-section of a sensing wire and a dielectric block of a touch panel according to another embodiment of the present disclosure. An outer lateral surface 221s of a sensing wire 221 is unaligned with the outer lateral surface 131s of the dielectric block 131. That is, the outer lateral surface 221s and the outer lateral surface 131s are not coplanar. A lower portion 221a2 of the sensing wire 221 is contracted relative to an upper portion 221a1. Further, as shown in FIG. 3, the outer lateral surface 221s of the sensing wire 221 is connected with the outer lateral surface 131s of the dielectric block 131 at a connecting portion Tc.

Figure 4:
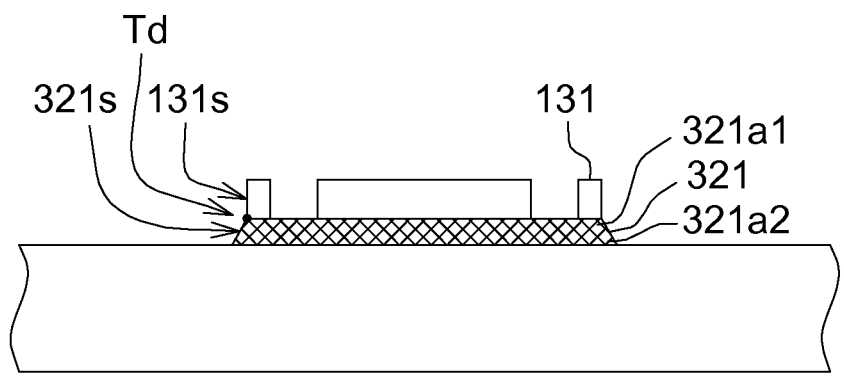
FIG. 4 is a cross-section of a sensing wire and a dielectric block according to another embodiment of the present disclosure.

FIG. 4 shows a cross-section of a sensing wire and a dielectric block of a touch panel according to yet another embodiment of the present disclosure. An outer lateral surface 321s of a sensing wire 321 is unaligned with the outer lateral surface 131s of the dielectric block 131. That is, the outer lateral surface 321s and the outer lateral surface 131s are not coplanar. A lower portion 321a2 of the sensing wire 321 is expanded relative to an upper portion 321a1. Further, as shown in FIG. 4, the outer lateral surface 321s of the sensing wire 321 is connected with the outer lateral surface 131s of the dielectric block 131 at a connecting portion Td.

FIGS. 5A to 5H show a manufacturing process for a touch panel according to another embodiment of the present disclosure.

Figure 5A:
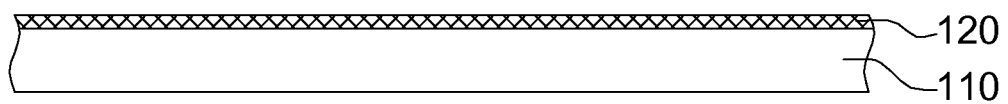
FIGS. 5A to 5H are diagrams of a manufacturing process of a touch panel according to another embodiment of the present disclosure

Referring to FIG. 5A, the conductive layer 120 is formed on the substrate 110.

Figure 5B:
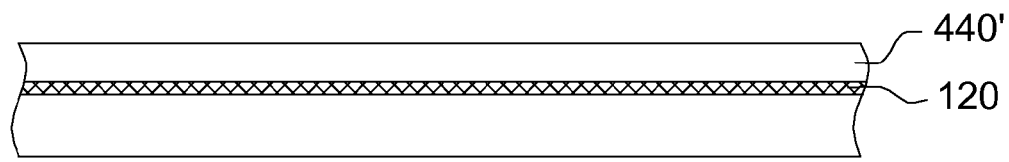
Figure 5C:
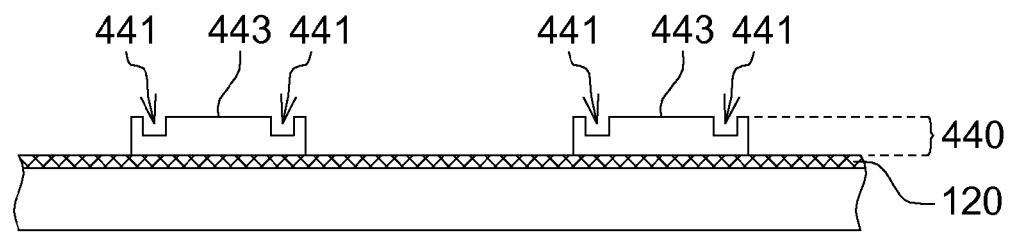

As shown in FIG. 5B, a dielectric layer 440' is formed to cover the conductive layer 120. In the present embodiment, the dielectric layer 440' is an organic photoresist layer 440'. For example, the photoresist layer 440' is an intact photoresist layer, that is, the photoresist layer 440' is a non-patterned photoresist layer.

Figure 5D:
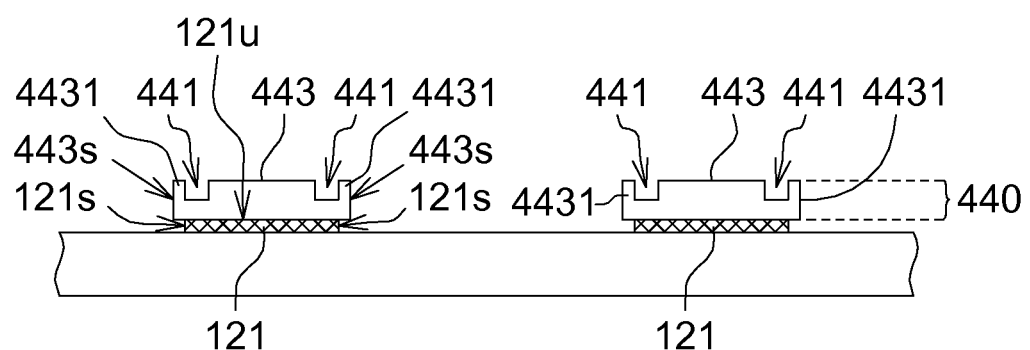
Figure 5E:
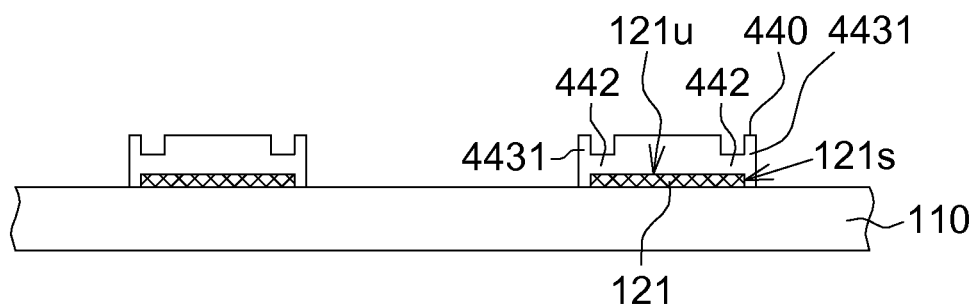
Figure 5F:
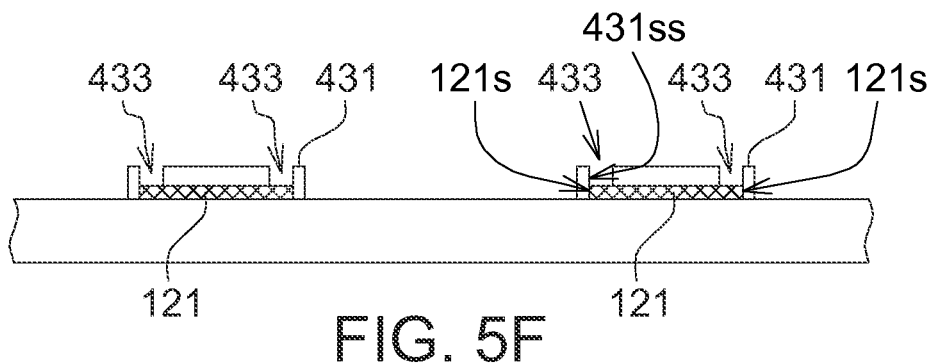

After forming the dielectric layer 440', through a first mask, the conductive layer 120 and the dielectric layer 440' are patterned to respectively form a plurality of sensing wires 121 (as shown in FIG. 5D) and a plurality of dielectric blocks 431 (as shown in FIG. 5F). The first mask is a half-tone mask, with details thereof to be described below.

Referring to FIG. 5C, through the half-tone mask, the dielectric layer 440' is patterned to form a patterned photoresist layer 440 on the conductive layer 120. The patterned photoresist layer 440 includes a plurality of recessions 441. Structures of the recessions 441 are similar to those of the foregoing recessions 141, and details thereof shall be omitted for brevity. Further, in the present embodiment, the patterned photoresist layer 440 may be an organic film.

The patterned photoresist layer 440 includes a plurality of photoresist blocks 443 each having two recessions 441.

Referring to FIG. 5D, by using the patterned photoresist layer 440 as a mask, the conductive layer 120 is patterned to form a plurality of sensing wires 121. The conductive layer 120 may be patterned by etching such as wet etching. Under the conditions, the patterned photoresist layer 440 serves as an etch stop layer.

Outer lateral surfaces 443s of the patterned photoresist layer 440 protrude beyond the outer lateral surfaces 121s of the sensing wires 121. Further, the photoresist blocks 443 may completely cover overall upper surfaces 121u of the sensing wires 121, and edge portions 4431 of the photoresist blocks 443 protrude beyond the outer lateral surfaces 121s of the sensing wires 121.

Referring to FIG. 5E, the patterned photoresist layer 440 is heated such that the patterned photoresist layer 440 encapsulates the sensing wires 121. Moreover, after heating the patterned photoresist layer 440, the edge portions 4431 of the patterned photoresist layer 440 become fluid and then extend to the outer lateral surfaces 121s of the sensing wires 121 to form the edge portions 4431. Accordingly, the patterned photoresist layer 440 is allowed to completely encapsulate the sensing wires 121. In addition, the edge portions 4431 are extended to contact the substrate 110.

Since the outer lateral surfaces 443s of the patterned photoresist layer 440 protrude beyond the outer lateral surfaces 121s of the sensing wires 121, the patterned photoresist layer 440 is naturally extended downward to cover the outer lateral surfaces 121s of the sensing wires 121 due to forces of gravity after being heated.

After heating the patterned photoresist layer 440, dielectric properties of the patterned photoresist layer 440 are increased to provide the patterned photoresist layer 440 with a better insulation capability.

Referring to FIG. 5F, in the patterned photoresist layer 440, portions 442 (shown in FIG. 5E) corresponding to the recessions 441 are removed to form a plurality of dielectric blocks 431 from the patterned photoresist layer 440. Each of the dielectric blocks 431 includes a plurality of through holes 433 corresponding to the recessions 441. For example, each of the dielectric blocks 431 has two through holes 433. The through holes 433 of the dielectric blocks 431 are formed after removing the portions 442 of the patterned photoresist layer 440. After the through holes 433 are formed, the sensing wires 121 are exposed from the through holes 433.

Since the edge portions 4431 are extended to the substrate 110, the edge portions 4431 of the dielectric blocks 431 are not easy to disengage after the through holes 433 are formed. Moreover, the edge portions 4431 of the patterned photoresist layer 440 are suspended edge portions (not extended to the substrate 110). Without the heating process of the patterned photoresist layer 440 in FIG. 5D, the edge portions 4431 are much likely to disengage from the patterned photoresist layer 440 in the step of forming the through holes 433, such that the through holes 433 cannot be formed. Further, in the present embodiment, the inner lateral surface 431ss of the dielectric blocks 431 are connected to the outer lateral surfaces 121s of the sensing wires 121. That is, the inner lateral surfaces 431ss of the dielectric blocks 431 are substantially adhered with the outer lateral surfaces 121s of the sensing wires 121.

Figure 5G:
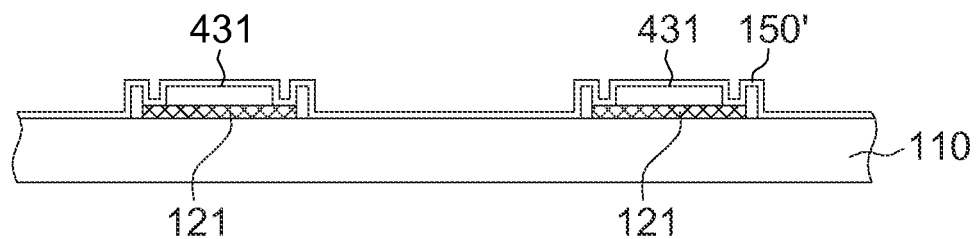

Referring to FIG. 5G, a transparent conductive layer 150' is formed to cover the dielectric blocks 431 and the sensing wires 121.

Figure 5H:
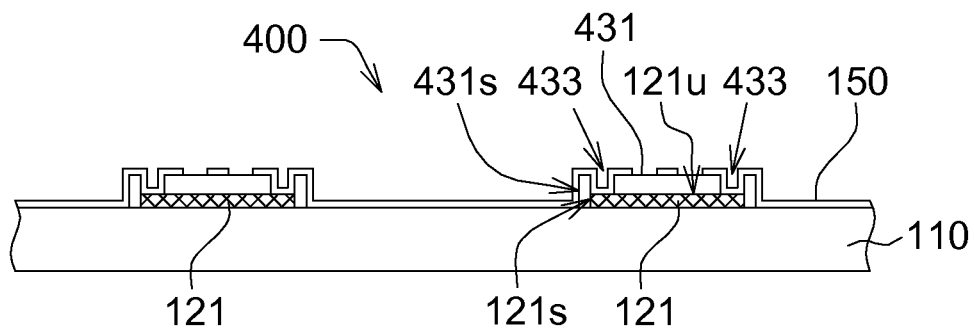

As shown in FIG. 5H, through a second mask, a touch sensing structure 150 is formed. The touch sensing structure 150 covers the dielectric blocks 431 and is extended via the through holes 433 to the sensing wires 121 to form the touch panel 400.

In the present embodiment, since the outer lateral surfaces 431s of the dielectric blocks 431 are smooth or even surfaces, parts of the touch sensing structure 150 extended along the outer lateral surfaces 431s of the dielectric blocks 431 are not formed into sharp corners.

In the present embodiment, the touch sensing structure 150 covers a part of the upper surfaces 121u of the sensing wires 121, and the dielectric blocks 431 cover the outer lateral surfaces 121s of the sensing wires and a remaining part of the upper surfaces 121u of the sensing wires 121, such that the touch sensing structure 150, the dielectric blocks 431 and the substrate 110 cover the entire sensing wires 121 to completely protect the sensing wires 121.

Figure 6:
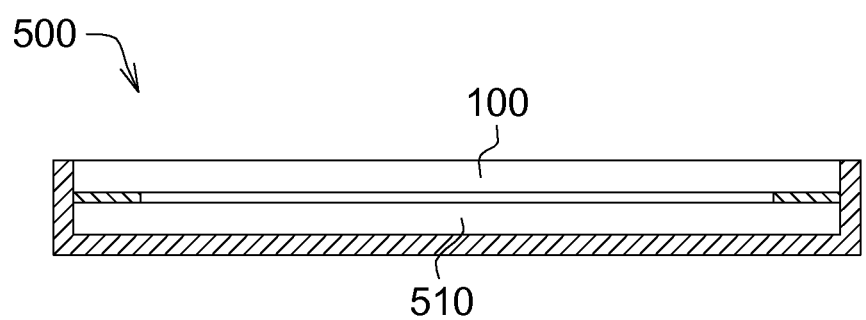
FIG. 6 is a cross-section of a touch display apparatus according to an embodiment of the present disclosure.

FIG. 6 shows a cross-section of a touch display apparatus according to an embodiment of the present disclosure. The touch panels 100 and 400 of the above embodiments may be applied to the display field.

Taking the touch panel 100 for example, a touch display apparatus 500 includes a display unit 510 and the touch panel 100. The display unit 510 provides a display image. The touch panel 100 is disposed adjacent to the display unit 510 for providing a touch sensing function. In the present embodiment, for example, the display unit 510 is a liquid crystal display apparatus or an organic light-emitting diode (OLED) display device.

With the description of the foregoing embodiments, it is illustrated that the touch panel, the touch display apparatus using the touch panel and the manufacturing method of the touch panel offer several distinct features from the prior art. Some of the features shall be described below.

Firstly, in an embodiment, the touch panel is formed by merely applying two mask processes to reduce manufacturing time and cost.

Secondly, in an embodiment, compared to a design without the recessions, the recessions disclosed in the embodiments of the present disclosure are capable of forming the through holes in the dielectric blocks under the condition that less material of the dielectric layer needs to be removed.

Thirdly, in an embodiment, since the outer lateral surfaces of the dielectric blocks are connected with the outer lateral surfaces of the sensing wires, the connecting portions between the outer lateral surfaces of the dielectric blocks and the outer lateral surfaces of the sensing wires are prevented from severe dislocation or even completely prevented from dislocation. Accordingly, parts of the touch sensing structure 150 extended along the outer lateral surfaces of the dielectric blocks and the outer lateral surfaces of the sensing wires are not formed with sharp corners.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch panel, comprising:
 a substrate;
 a first sensing wire, formed on the substrate;
 a dielectric block, formed on the first sensing wire and comprising two through holes, wherein the first sensing wire is exposed from the two through holes; and
 a touch sensing structure, covering the dielectric block and extending to the first sensing wire via the two through holes;
 wherein, an outer lateral surface of the first sensing wire is connected to an outer lateral surface or an inner lateral surface of the dielectric block, and the first sensing wire and the dielectric block are formed by using the same half-tone mask.

2. The touch panel according to claim 1, wherein the outer lateral surface of the first sensing wire is substantially aligned with the outer lateral surface of the dielectric block.

3. The touch panel according to claim 1, wherein the outer lateral surface of the first sensing wire is substantially adhered to the inner lateral surface of the dielectric block.

4. A touch display apparatus, comprising:
   a display unit, for providing a display image; and
   a touch panel according to claim 1, disposed adjacent to the display unit, for providing a touch sensing function.

* * * * *